(12) United States Patent
Yang et al.

(10) Patent No.: US 12,052,108 B2
(45) Date of Patent: Jul. 30, 2024

(54) CHANNEL-STATE INFORMATION FEEDBACK ENHANCEMENT FOR ULTRA-RELIABLE LOW-LATENCY COMMUNICATION

(71) Applicant: APPLE INC., Cupertino, CA (US)

(72) Inventors: Weidong Yang, San Diego, CA (US); Chunhai Yao, Beijing (CN); Chunxuan Ye, San Diego, CA (US); Dawei Zhang, Cupertino, CA (US); Haitong Sun, Cupertino, CA (US); Hong He, Cupertino, CA (US); Huaning Niu, Cupertino, CA (US); Oghenekome Oteri, San Diego, CA (US); Seyed Ali Akbar Fakoorian, San Diego, CA (US); Sigen Ye, San Diego, CA (US); Wei Zeng, Cupertino, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 356 days.

(21) Appl. No.: 17/593,313

(22) PCT Filed: May 11, 2021

(86) PCT No.: PCT/CN2021/093155
§ 371 (c)(1),
(2) Date: Sep. 15, 2021

(87) PCT Pub. No.: WO2022/236713
PCT Pub. Date: Nov. 17, 2022

(65) Prior Publication Data
US 2023/0208565 A1    Jun. 29, 2023

(51) Int. Cl.
*H04W 72/23*    (2023.01)
*H04B 7/06*    (2006.01)
(Continued)

(52) U.S. Cl.
CPC ......... *H04L 1/1861* (2013.01); *H04B 7/0626* (2013.01); *H04L 1/1671* (2013.01); *H04W 72/23* (2023.01); *H04L 1/1812* (2013.01)

(58) Field of Classification Search
None
See application file for complete search history.

(56) References Cited

U.S. PATENT DOCUMENTS 10,972,225 B2 * 4/2021 Khoshnevisan ...... H04L 1/1864
2019/0068317 A1 * 2/2019 Babaei .................. H04L 1/1664
(Continued)

FOREIGN PATENT DOCUMENTS

CN    103580823 A    2/2014

OTHER PUBLICATIONS

R1-2100269 (Year: 2021).*
(Continued)

*Primary Examiner* — Kodzovi Acolatse
*Assistant Examiner* — Anindita Sen
(74) *Attorney, Agent, or Firm* — Dorsey & Whitney LLP

(57) ABSTRACT

A wireless communication system may use enhanced feedback indicating a PDSCH decoding outcome. The enhanced feedback may be in an uplink control information (UCI) and carried over PUCCH or PUSCH. The enhanced feedback may be encoded and divided up into two parts of the UCI. A first payload may be carried in a first part of the UCI and a second payload comprising additional feedback information may be carried in a second part of the UCI.

18 Claims, 9 Drawing Sheets

(51) Int. Cl.
*H04L 1/1607* (2023.01)
*H04L 1/1829* (2023.01)
*H04L 1/1812* (2023.01)

(56) References Cited

U.S. PATENT DOCUMENTS

| | | | |
|---|---|---|---|
| 2019/0103943 | A1 | 4/2019 | Wang et al. |
| 2020/0059327 | A1* | 2/2020 | Kini .................. H04L 43/06 |
| 2022/0217678 | A1* | 7/2022 | Yoshioka .............. H04W 72/02 |
| 2022/0278809 | A1* | 9/2022 | Papasakellariou .... H04L 1/1614 |
| 2022/0279559 | A1* | 9/2022 | Wong .................... H04L 5/0053 |

OTHER PUBLICATIONS

R1-2103106 (Year: 2021).*
R1-2009455 (Year: 2020).*

Apple Inc., "Views on Intra-UE Multiplexing/Prioritization", R1-2103106, 3GPP TSG-RAN WG1 Meeting #104b-e, e-Meeting, Agenda Item 8.3.3, Apr. 12-20, 2021, 32 pages.
ERICSSON, "CSI Feedback Enhancements for IIoT/URLLC", Tdoc R1-2100269, 3GPP TSG-RAN WG1 Meeting #104-e, Electronic Meeting, Agenda Item 8.3.1.2, Jan. 25-Feb. 5, 2021, 12 pages.
Moderator (Interdigital, Inc.), "Feature lead summary #1 on CSI feedback enhancements for enhanced URLLC/IIoT", R1-2009455, 3GPP TSG RAN WG1 #103-e, e-Meeting, Agenda Item 8.3.1.2, Oct. 26-Nov. 13, 2020, 10 pages.
PCT/CN2021/093155, International Search Report and Written Opinion, Feb. 10, 2022, 9 pages.
Ericsson, "CSI Feedback Enhancements for IIoT/URLLC", Tdoc R1-2102745, 3GPP TsSG-RAN WG1 Meeting #104-bis-e, Electronic meeting, Agenda Item 8.3.1.2, Apr. 12-20, 2021, 18 pages.
Lenovo, Motorola Mobility, "CSI feedback enhancements for URLLC/IIoT", R1-2103611, 3GPP TSG RAN WG1 #104b-e, E-Meeting, Agenda Item 8.3.1.2, Apr. 12-20, 2021, 4 pages.

* cited by examiner

CHANNEL-STATE INFORMATION FEEDBACK ENHANCEMENT FOR ULTRA-RELIABLE LOW-LATENCY COMMUNICATION

TECHNICAL FIELD

This application relates generally to wireless communication systems, including Channel-State Information (CSI) feedback enhancement.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a or g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

One goal in network communications is reliability. To improve reliability, a network communication system may use redundancy in transmissions. However, if a transmission is able to be received with less redundancy, the network communication system may be unnecessarily using more resources than necessary. Enhanced reporting by a user equipment (UE) may be used to increase reliability and reduce unnecessary use of resources.

Embodiments herein describe systems, apparatuses, and methods for Channel-State Information (CSI) feedback enhancement for Ultra-reliable low-latency communication (URLLC). Enhanced feedback may allow the UE to more precisely indicate how well a Physical Downlink Shared Channel (PDSCH) was decoded. For example, Enhanced feedback may allow the UE to indicate that the PDSCH was decoded or failed to be decoded with a high margin or a low margin. A network node may use the enhanced feedback to determine length of retransmission of PDSCH and potentially for initial transmission for the next transport block.

Enhanced CSI feedback may allow a more accurate modulation and coding scheme (MCS) selection at the network node. Embodiments may use measurements or metrics generated by a UE decoding a current PDSCH to determine redundancy for retransmission and potentially for initial transmission for the next transport block.

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

Various operations will be described as multiple discrete operations, in turn, in a manner that is most helpful in understanding the disclosure. The order of the description, however, should not be construed to imply that these operations are necessarily order dependent. In particular, these operations need not be performed in the order of presentation.

Additional details and examples are provided with reference to the figures below. The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments.

Figure 1:
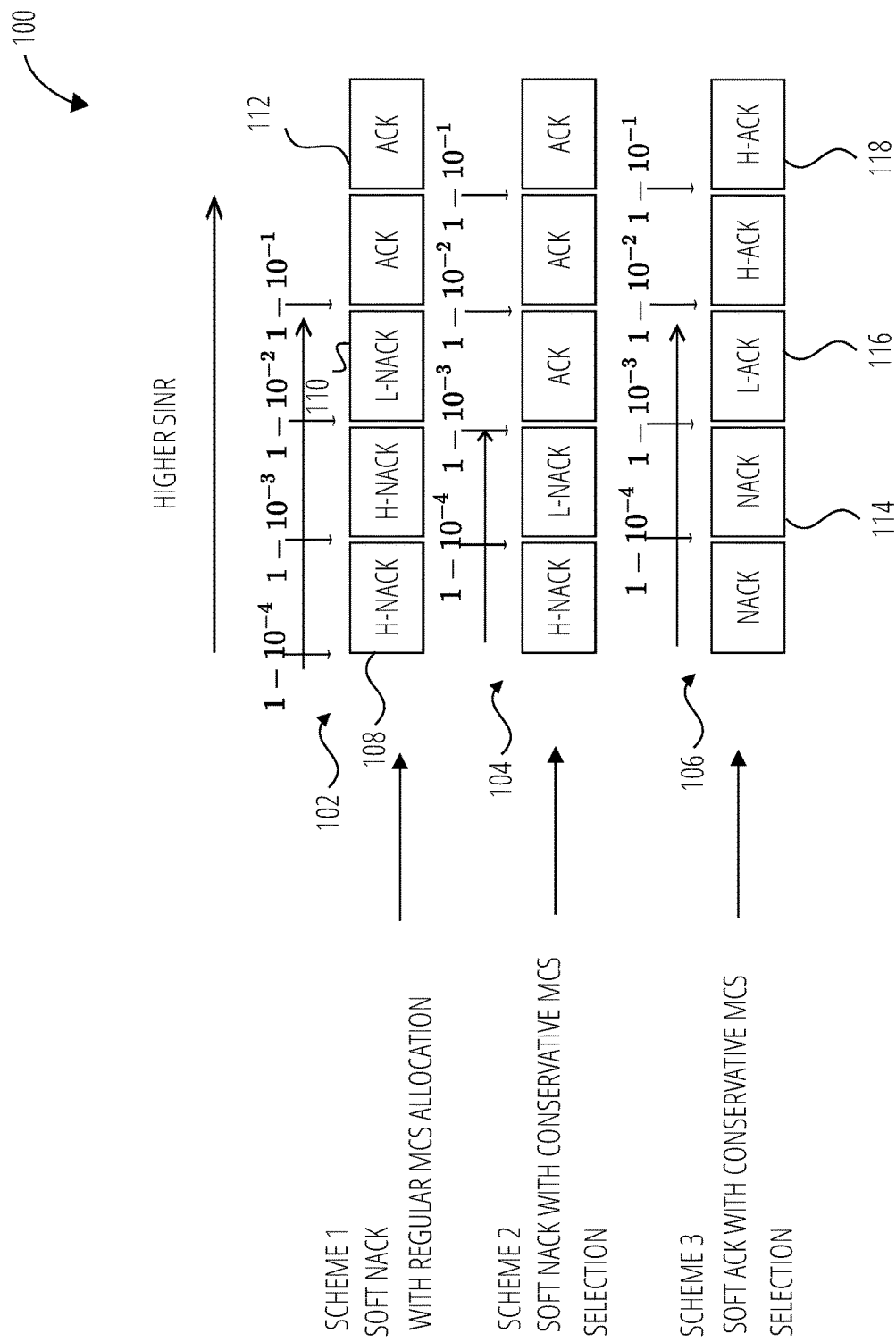
FIG. 1 illustrates schemes for providing enhanced CSI feedback in accordance with one embodiment.

FIG. 1 illustrates schemes 100 for providing enhanced CSI feedback, in accordance with some embodiments. Signal to interference plus noise ratio (SINR) is the ratio of the received signal level and the sum of interference and noise. SINR may be measured and used only in UE. It is used to indicate the relationship between a signal from the network node and noise/interference. The UE may use the SINR to calculate a CQI value. The CQI may indicate a data rate that the UE can support under the current radio conditions. An MCS parameter may be assigned based on the CCQI value.

Traditionally, a UE may indicate if a PDSCH was successfully decoded using an acknowledgement (ACK). Further, the UE may indicate that the PDSCH was not successfully decoded using a Negative Acknowledgement (NACK). To provide additional granularity than a simple ACK or a NACK, a UE may provide additionally information such as CSI along with the ACK/NACK. The CSI reporting may include delta-channel quality indicator (CQI) or delta-MCS or CQI or MCS. This CSI feedback enhancement of ACK/NACK may allow a UE to report not only the outcome of the PDSCH decoding, but also with what margin the decoding happened. The CSI feedback enhancement may allow for soft ACKS/NACKS. Soft ACKS/NACKS may indicate by what margin the PDSCH was decoded or failed to be decoded.

In some embodiments, the outcome of PDSCH decoding can be described with up to four states: high ACK, low ACK, low NACK, high NACK. Not all of these states may be present in a scheme. In some embodiments, all four states may be used, while in other embodiments, a subset of states may be used. High ACK may indicate a state in which PDSCH decoding succeeds with a high margin and little or no additional feedback information is generated by the UE. Low ACK may indicate a state where PDSCH decoding succeeds with a low margin, and additional feedback information may be generated such as delta CQI/MCS, equivalent CQI/MCS for the reception up to now, etc. Low NACK may indicate a state in which the PDSCH decoding fails with a low margin (PDSCH decoding almost succeeds), and the UE may generate additional feedback information is such as delta CQI/MCS, equivalent CQI/MCS for the reception up to now, etc. High NACK may indicate a state where PDSCH decoding fails with a high margin (PDSCH decoding fails miserably), and the UE may generate additional feedback information such as delta CQI/MCS, equivalent CQI/MCS for the reception up to now, etc.

As shown in the schemes 100 there may be fewer than all four of these states supported. For example, as shown in a first scheme 102, a soft NACK may be used to indicate the varying levels of the UE failing to decode the PDSCH. A high-NACK (H-NACK 108), a low-NACK (L-NACK 110), and an ACK 112 may be states representing the success or failure of the UE decoding the PDSCH. With an L-NACK 110, PDSCH decoding fails with a low margin. In some embodiments, the UE may send to a network node the L-NACK 110 and generate and send additional feedback information such as delta CQI/MCS, equivalent CQI/MCS for the reception up to now, etc. With the H-NACK 108, PDSCH decoding fails with a high margin. In some embodiments, the UE may send to a network node the H-NACK 108 and generate and send additional feedback information such as delta CQI/MCS, equivalent CQI/MCS for the reception up to now, etc. The UE may send a simple ACK 112 if the PDSCH was successfully decoded.

A second scheme 104 may similarly use ACK, L-NACK, and H-NACK. However, the second scheme 104 may use a more conservative MCS selection. As shown, in second scheme 104 ACK may correspond to a lower SINR.

Alternatively, a third scheme 106 may use NACK 114, low ACK (L-ACK 116), and high ACK (H-ACK 118). With H-ACK 118, the UE succeeds at decoding the PDSCH with a high margin, little or no additional feedback information may be generated. With L-ACK 116 the UE succeeds at decoding the PDSCH decoding succeeds with a low margin and the UE generates additional feedback information such as delta CQI/MCS, equivalent CQI/MCS for the reception up to now, etc. Hence for a state, there can be sub-states, for example with delta CQI, delta MCS, or CQI or MCS under the low ACK state. And it is possible to report one sub-state directly without signaling the state. In the following, delta-MCS is referred as additional feedback information besides HARQ-ACK, it is understood that other metrics can be used, such as delta-CQI, CQI or MCS.

When the UE transmits the CSI feedback reporting quantities to the network node, the CSI payload size may depend on the PDSCH decoding outcome. For example, if the PDSCH is decoded successfully with a high margin, then a simple ACK may be enough in some schemes 100, on the other hand, if the PDSCH decoding is not successful or succeeds with a low margin additional information beyond the ACK may be helpful to the network node.

In some embodiments, irrespective of the PDSCH decoding outcome (high ACK, low ACK, low NACK, high NACK), the same feedback overhead may be used. In other words, in these embodiments payload size does not change with the PDSCH decoding outcome. However, this may not be desirable as for some cases (e.g. with BLER requirement at $10^{-6}$, then the feedback overhead is incurred for no good reason).

Hence some embodiments herein employ overhead control for reporting of delta-CQI/MCS. In some embodiments, the enhanced feedback can be treated as something between HARQ-ACK feedback and CSI feedback. In some embodiments, feedback payload can be small for some code states and large for other code states. For example, in some embodiments to support overhead control, feedback payload can be small when the UE generates a high ACK for PDSCH. Conversely, the feedback payload can be large for other cases. In another embodiment, the setup may include Block Error Rate (BLER) at $1e$-6 with a good control on open loop link adaptation. In this and similar embodiments, feedback payload can be small when the UE generates a normal ACK for PDSCH, and the feedback payload can be large for other cases.

Figure 2:
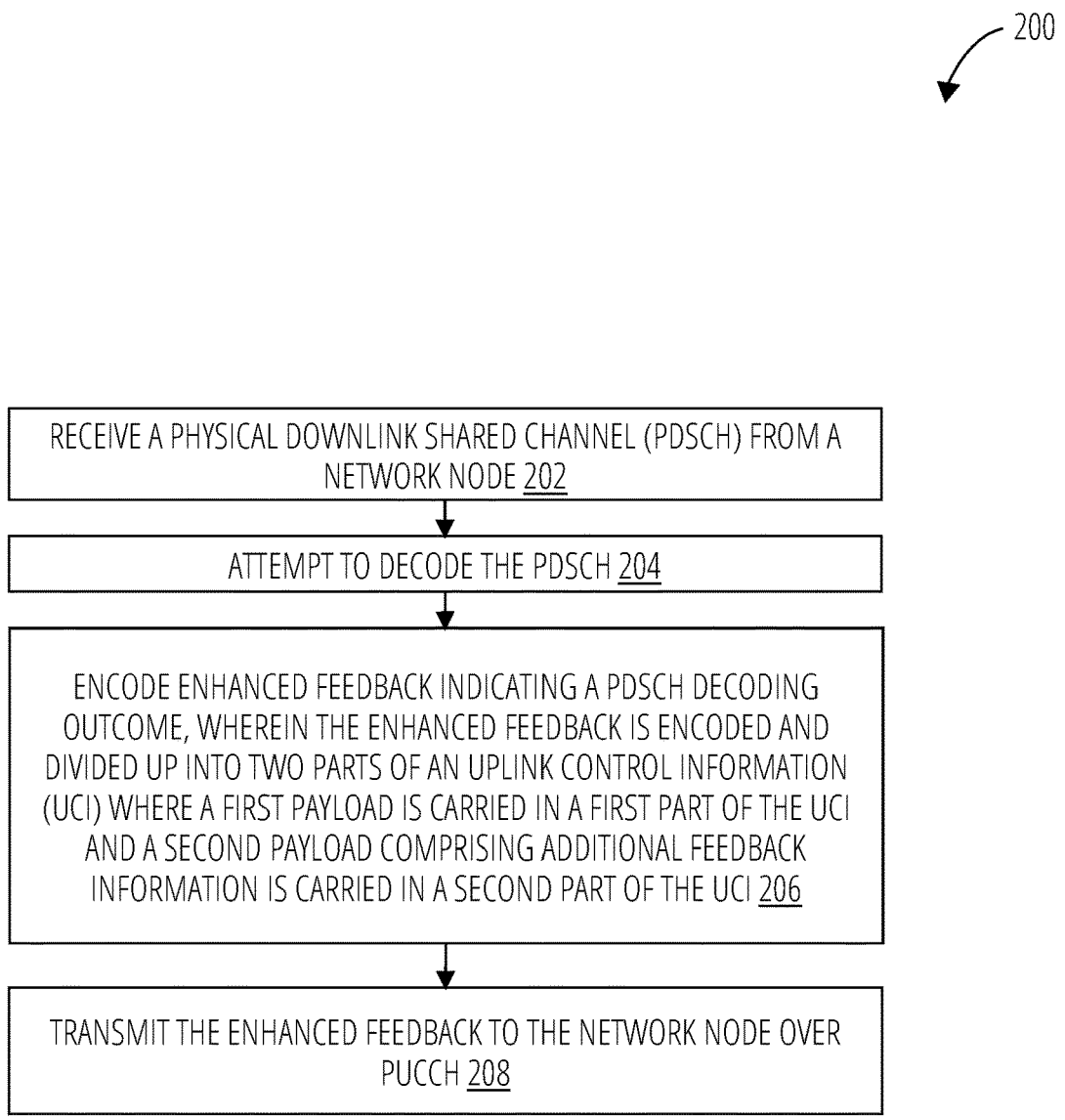
FIG. 2 is a flowchart of a method for a UE to report enhanced feedback over Physical Uplink Control Channel (PUCCH) in accordance with one embodiment.
Figure 6:
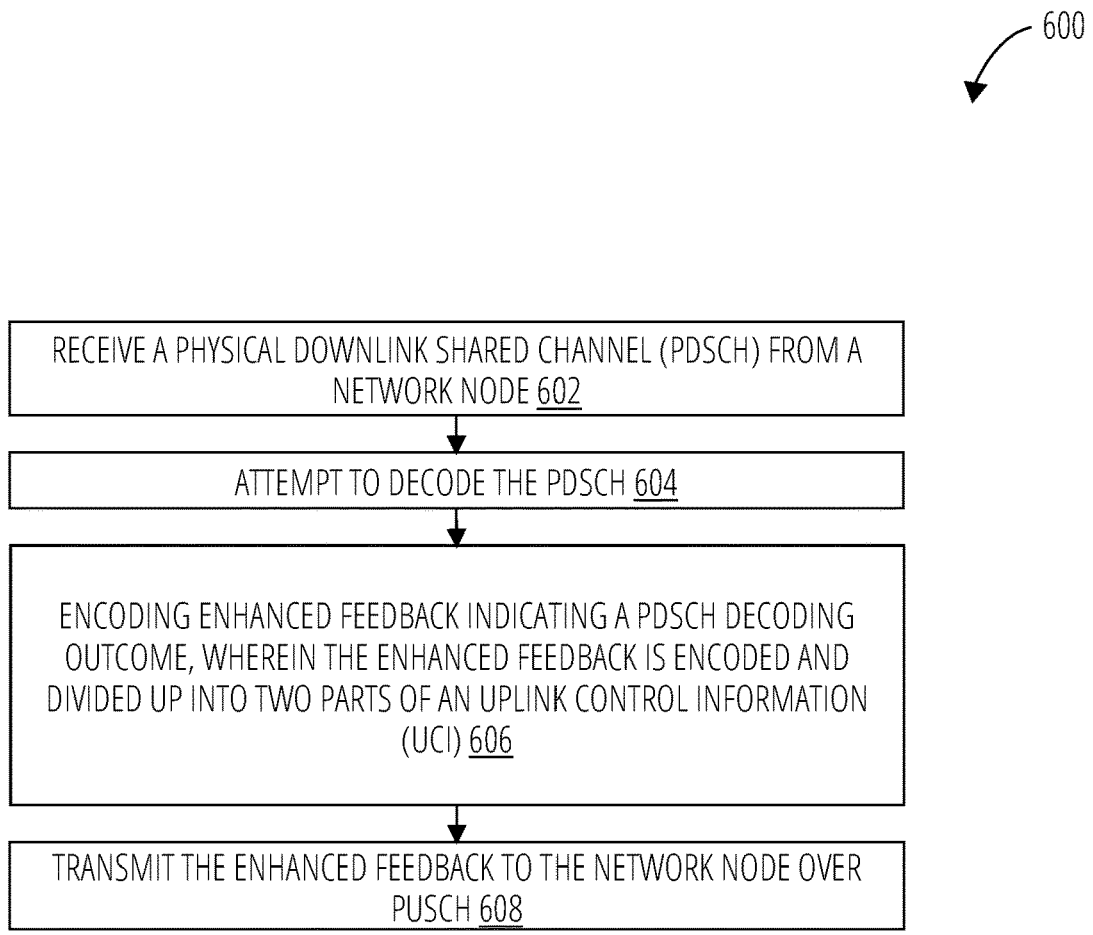
FIG. 6 is a flowchart of a method for a UE to report enhanced feedback over Physical Uplink Shared Channel (PUSCH) in accordance with one embodiment.

FIG. 2 is a flowchart of a method 200 for a UE to report enhanced feedback over Physical Uplink Control Channel (PUCCH). The enhanced feedback may indicate both Hybrid Automatic Repeat Request (HARQ) status (e.g., ACK, NACK, high ACK, low ACK, high NACK, low NACK) as well as feedback information such as delta MCS/CQI. The method 200 considers the case where enhanced feedback is carried over PUCCH. FIG. 6 illustrates a similar method 600 for transmitting the enhanced feedback over PUSCH.

A UE implementing the method 200 may receive 202 a PDSCH from a network node. The UE may attempt to decode 204, the PDSCH. The UE may successfully decode the PDSCH or fail to decode the PDSCH. The enhanced feedback may allow the UE to report a successful decoding or a failed decoding and additional information to the network node.

The UE may encode 206 the enhanced feedback to indicate a PDSCH decoding outcome. The UE may include the enhanced feedback in a UCL In some embodiments, the UE may split the enhanced feedback into multiple payloads. For example, due to uncertainty in the feedback payload, the UE may divide the enhanced feedback into two parts. The two parts are referred to as a first payload and a second payload. The first payload may provide information regardÂing a state of PDSCH decoding (i.e., HARQ feedback) such as whether the state is one of a high ACK, low ACK, low Negative NACK, high NACK or a count of the number of PDSCHs corresponding to high ACKs. The second payload may provide additional information such as delta MCS/CQI.

In some embodiments, in a first part of the UCI (i.e., UCI part I), a first payload may be carried over PUCCH. The first payload may be a fixed payload carried irrespective of PDSCH decoding outcome. In a second part of the UCI (i.e., UCI part II), additional feedback information may be carried according to the payload content in the first part of the UCI. In other words, in some embodiments the first payload is a fixed number of bits irrespective of the PDSCH decoding outcome, and the second payload varies in size based on the PDSCH decoding outcome. In other embodiments, both the first payload and the second payload may be fixed.

There may be a variety of ways for a UE to provide the enhanced feedback using PUCCH. The following describes three embodiments that may be used.

First Embodiment

In a first embodiment, the first payload may be a bitmap representing high ACK status in UCI part I, and the second payload may include a list of delta/MCS and be carried in UCI part II. For example, a modified HARQ-ACK may be carried in UCI part I, where a bit value of 1 is used to represent high ACK and a bit value of 0 is used to indicate the other cases. For example, low ACK, high NACK, and low NACK may all be indicated by a bit value of 0 in UCI part I. The second payload in UCI part II may provide additional details that may distinguish the cases represented by the bit value of 0. For example, the second payload may be included in UCI part II and include delta MCS/CQI and further information about HARQ-ACK.

If the PDSCH decoding is a high ACK, UCI part I may be set to "1", and UCI part II may be empty. Further, a low ACK may be indicated by setting UCI part I to "0", and setting UCI part II to a delta MCS/CQI value in range 1. In some embodiments low ACK may be indicated by setting UCI part I to "0" and setting UCI part II to a code state for low ACK and delta MCS/CQI. A low NACK may be indicated by setting UCI part I to "0", and setting UCI part II to a delta MCS/CQI value in range 2. In some embodiments low NACK may be indicated by setting UCI part I to "0" and setting UCI part II to a code state for low NACK and delta MCS/CQI. A high NACK may be indicated by setting UCI part I to "0", and setting UCI part II to a delta MCS/CQI value in range 3. In some embodiments high NACK may be indicated by setting UCI part I to "0" and setting UCI part II to a code state for high NACK and delta MCS/CQI.

The length of the second payload may be based on the PDSCH decoding outcome. The delta MCS/CQI ranges can be RRC configured, MAC CE indicated, or specified. In some embodiments, there may be $n_1$ levels for delta MCS/CQI or MCS/CQI for low ACK. There may be $n_2$ levels for delta MCS/CQI or MCS/CQI for low NACK. There may be $n_3$ levels for delta MCS/CQI or MCS/CQI for high NACK. In such an embodiment, the second payload may be a number of bits equivalent to $\lceil \log_2(n_1+n_2+n_3) \rceil$ bits may be used to indicate one code state out of $n_1+n_2+n_3$ code states.

It may also be possible for the UE to indicate a state of not receiving a scheduling PDCCH or a state of not detecting PDSCH. There may be $n_4$ code states can be used for the state of not receiving a scheduling PDCCH or the state of not detecting PDSCH or any other cases. In such an embodiment, a number of bits equivalent to $\lceil \log_2(n_1+n_2+n_3+n_4) \rceil$ bits may be used to indicate one code state out of $n_1+n_2+n_3+n_4$ code states.

It may be also possible in some embodiments for the UE to indicate the delta MCS with respect to the current MCS of the PDSCH. For example, if the delta MCS is within a range or a range associated with the current MCS, then the further information may be omitted, if the delta MCS is within another range, then further information is not omitted. As in the current NR design, the gap between two MCS levels can be large, a sub-unit between two MCS levels can be used. For instance, if the current MCS level is at 10, and the UE estimates the current channel condition or the accumulated LLRs would support a MCS level between MCS 11 and MCS 12, then a delta MCS level corresponding to 11.5 can be reported. Note the report's validity may be further conditioned on the TBS size of the current PDSCH to reflect the required SINR to decode a PDSCH at a given MCS level may be different for a PDSCH with a small TBS (transport block Size) size than for a PDSCH with a large TBS size. The validity of the report can alternately or in addition assume the effective coding rate of the transport block including prior PDSCH reception(s) for the same transport block, or the mother code rate of the for low-density parity-check (LPDC) base graph group (e.g. ⅓ for LPDC Base Graph 1 and ⅕ for LDPC Base Graph 2), and when the limited buffer for rate matching is used, the coding rate can be higher than the mother code's. The validity of the report can alternately or in addition assume a redundancy version, e.g. redundancy version 0.

It may be also possible in some embodiments for the UE to indicate the delta CQI with respect to the current MCS of the PDSCH. For example, if the delta CQI is within a range or within a range associated the current MCS, then the further information may be omitted, if the delta CQI is within another range, then further information is not omitted. As in the current NR design, the gap between two CQI levels can be large, a sub-unit between two CQI levels can be used. For instance, if the current MCS level is at 10, and the UE estimates the current channel condition or the accumulated LLRs would support a delta CQI level at −1 dB for the current MCS level, then a delta CQI level corresponding to −1 dB can be reported. Note the report's validity may be further conditioned on the TBS size of the current PDSCH to reflect the required SINR to decode a PDSCH at a given MCS level may be different for a PDSCH with a small TBS (transport block Size) size than for a PDSCH with a large TBS size. The delta CQI's step (difference between two Delta CQIs) can be uniform or non-uniform. The validity of the report can alternately or in addition assume the effective coding rate of the transport block including prior PDSCH reception(s) for the same transport block, or the mother code rate of the LDPC base graph group (e.g. 1/3 for LPDC Base Graph 1 and 1/5 for LDPC Base Graph 2), and when the limited buffer for rate matching is used, the coding rate can be higher than the mother code's. The validity of the report can alternately or in addition assume a redundancy version, e.g. redundancy version 0.

With the first embodiment, the modified HARQ-ACK may be carried in UCI part I, which can be justified for Ultra-Reliable and Low Latency (URLLC) traffic, yet the extension of such a solution to Enhanced Mobile Broadband (eMBB) traffic or low physical layer priority PDSCHs may be problematic as a low priority (LP) HARQ-ACK should be mapped to UCI Part II. Additionally, there is a chance that the enhanced feedback for multiple URLLC PDSCHs may be carried in the same PUCCH. Accordingly, a second embodiment may be employed.

Second Embodiment

In the second embodiment, the first payload may be a counter of high ACKs that may be carried in UCI part I, and the second payload may be a bitmap to represent high ACK status and a list of delta/MCS that may be carried in UCI part II. For instance a number of high ACKs may be indicated in UCI part I, UCI part II may include a list of delta MCS/CQI for multiple PDSCHs and a bitmap for high ACKs. In some embodiments the list of delta MCS/CQI and the bitmap for high ACKs may be concatenated. For example, the bitmap may come first in the UCI part II followed by the list of the delta MCS/CQI. In the list of delta MCS/CQI, if the PDSCH decoding is a high ACK, then the delta MCS/CQI may be omitted.

The length of the second payload may be based on the PDSCH decoding outcome. Further, the length of the first payload may be based on the number of PDSCHs being reported. A PUCCH may have enhanced feedback for m PDSCHs. In one example, m=5 and the PDSCH1, PDSCH2, PDSCH3, PDSCH4, PDSCH-5 respectively correspond with high ACK, low ACK, low NACK, high NACK, high ACK. Further, $\lceil \log_2(m+1) \rceil$ bits may be used to indicate the number of high ACKs in the first payload. For instance, in the example above where m=5, then $\lceil \log_2(m+1) \rceil$=3, and as there are two PDSCHs out of 5 PDSCHs with high ACK, two may be indicated with the 3 bit counter (e.g. "0b010") in UCI part I. For UCI multiplexing, the counter of high ACKs may be carried in UCI part I.

Then a m-bit bitmap may be used to indicate the high ACK status as part of the second payload in UCI part II. In the example above where m=5, the bitmap is [10001] because only the first and last PDSCH corresponded to a high ACK. Additionally the list of delta MCS/CQI for the second payload in UCI part II may be given by listing the delta MCS/CQI for the non-high ACK PDSCHs. In the m=5 example, the list may be [delta MCS/CQI for PDSCH-2, delta MCS/CQI for PDSCH-3, delta MCS/CQI for PDSCH-4]. For multiple PDSCHs, the bitmap describing PDSCHs corresponding to high ACKs and the list of delta MCS/CQI formulations described here with reference to the second embodiment can be also used in the second payload of the first embodiment.

It may be also possible in some embodiments for the UE to indicate the delta MCS with respect to the current MCS of the PDSCH. For example, if the delta MCS is within a range or a range associated with the current MCS, then the further information may be omitted, if the delta MCS is within another range, then further information is not omitted. As in the current NR design, the gap between two MCS levels can be large, a sub-unit between two MCS levels can be used. For instance, if the current MCS level is at 10, and the UE estimates the current channel condition or the accumulated LLRs would support a MCS level between MCS 11 and MCS 12, then a delta MCS level corresponding to 11.5 can be reported. Note the report's validity may be further conditioned on the TBS size of the current PDSCH to reflect the required SINR to decode a PDSCH at a given MCS level may be different for a PDSCH with a small TBS (transport block Size) size than for a PDSCH with a large TBS size. The validity of the report can alternately or in addition assume the effective coding rate of the transport block including prior PDSCH reception(s) for the same transport block, or the mother code rate of the for low-density parity-check (LPDC) base graph group (e.g. 1/3 for LPDC Base Graph 1 and 1/5 for LDPC Base Graph 2), and when the limited buffer for rate matching is used, the coding rate can be higher than the mother code's. The validity of the report can alternately or in addition assume a redundancy version, e.g. redundancy version 0.

It may be also possible in some embodiments for the UE to indicate the delta CQI with respect to the current MCS of the PDSCH. For example, if the delta CQI is within a range or within a range associated the current MCS, then the further information may be omitted, if the delta CQI is within another range, then further information is not omitted. As in the current NR design, the gap between two CQI levels can be large, a sub-unit between two CQI levels can be used. For instance, if the current MCS level is at 10, and the UE estimates the current channel condition or the accumulated LLRs would support a delta CQI level at −1 dB for the current MCS level, then a delta CQI level corresponding to −1 dB can be reported. Note the report's validity may be further conditioned on the TBS size of the current PDSCH to reflect the required SINR to decode a PDSCH at a given MCS level may be different for a PDSCH with a small TBS (transport block Size) size than for a PDSCH with a large TBS size. The delta CQI's step (difference between two Delta CQIs) can be uniform or non-uniform. The validity of the report can alternately or in addition assume the effective coding rate of the transport block including prior PDSCH reception(s) for the same transport block, or the mother code rate of the LDPC base graph group (e.g. 1/3 for LPDC Base Graph 1 and 1/5 for LDPC Base Graph 2), and when the limited buffer for rate matching is used, the coding rate can be higher than the mother code's. The validity of the report can alternately or in addition assume a redundancy version, e.g. redundancy version 0.

Third Embodiment

In a third embodiment, in lieu of a single HARQ feedback bit (e.g., the first payload of the first embodiment), multiple feedback bits may be provided in the feedback, and the number of feedback bits does not change with the PDSCH decoding status. Alternatively or in addition, if there may be $n_0$ levels for delta MCS/CQI or MCS/CQI for high ACK, then the payload may be a number of bits equivalent to $\lceil \log_2(n_0+n_1+n_2+n_3) \rceil$ bits may be used to indicate one code state out of $n_0+n_1+n_2+n_3$ code states.

It may be also possible in some embodiments for the UE to indicate the delta MCS with respect to the current MCS of the PDSCH. For example, if the delta MCS is within a range or a range associated with the current MCS, then the further information may be omitted, if the delta MCS is within another range, then further information is not omitted. As in the current NR design, the gap between two MCS levels can be large, a sub-unit between two MCS levels can be used. For instance, if the current MCS level is at 10, and the UE estimates the current channel condition or the accumulated LLRs would support a MCS level between MCS 11 and MCS 12, then a delta MCS level corresponding to 11.5 can be reported. Note the report's validity may be further conditioned on the TBS size of the current PDSCH to reflect the required SINR to decode a PDSCH at a given MCS level may be different for a PDSCH with a small TBS (transport block Size) size than for a PDSCH with a large TBS size. The validity of the report can alternately or in addition assume the effective coding rate of the transport block including prior PDSCH reception(s) for the same transport block, or the mother code rate of the for low-density parity-check (LPDC) base graph group (e.g. ⅓ for LPDC Base Graph 1 and ⅕ for LDPC Base Graph 2), and when the limited buffer for rate matching is used, the coding rate can be higher than the mother code's. The validity of the report can alternately or in addition assume a redundancy version, e.g. redundancy version 0.

It may be also possible in some embodiments for the UE to indicate the delta CQI with respect to the current MCS of the PDSCH. For example, if the delta CQI is within a range or within a range associated the current MCS, then the further information may be omitted, if the delta CQI is within another range, then further information is not omitted. As in the current NR design, the gap between two CQI levels can be large, a sub-unit between two CQI levels can be used. For instance, if the current MCS level is at 10, and the UE estimates the current channel condition or the accumulated LLRs would support a delta CQI level at −1 dB for the current MCS level, then a delta CQI level corresponding to −1 dB can be reported. Note the report's validity may be further conditioned on the TBS size of the current PDSCH to reflect the required SINR to decode a PDSCH at a given MCS level may be different for a PDSCH with a small TBS (transport block Size) size than for a PDSCH with a large TBS size. The delta CQI's step (difference between two Delta CQIs) can be uniform or non-uniform. The validity of the report can alternately or in addition assume the effective coding rate of the transport block including prior PDSCH reception(s) for the same transport block, or the mother code rate of the LDPC base graph group (e.g. ⅓ for LPDC Base Graph 1 and ⅕ for LDPC Base Graph 2), and when the limited buffer for rate matching is used, the coding rate can be higher than the mother code's. The validity of the report can alternately or in addition assume a redundancy version, e.g. redundancy version 0.

A UE may transmit 208 the enhanced feedback to the network node. The transmission may use an existing HARQ codebook or be separate from existing HARQ codebook.

The three embodiments may be used separately from an existing HARQ codebook. In NR there are occasions where a single HARQ-ACK feedback is used, such as for downlink grant (DG) PDSCH or Semi-Persistent Scheduling (SPS) PDSCH (with a single SPS configured in a cell group for example). In these cases the three embodiments may be implemented outside of an existing HARQ codebook.

However, in other cases, the three embodiments may be implemented as an add-on to existing HARQ codebooks. For example, in Rel-15, two HARQ codebooks were introduced Type 1 HARQ codebook (semi-static codebook) and Type II HARQ codebook (dynamic HARQ Codebook). In Rel-16, out of the Rel-16 URLLC work item (WI), two separate HARQ codebooks were introduced separately for high physical priority PDSCHs and low physical layer priority PDSCHs. A SPS only HARQ codebook was introduced. From the Rel-16 NR-U WI, a so-called enhanced Type 2 codebook was introduced, and a Type 3 HARQ-codebook was introduced. From the Rel-16 eMIMO WI, for multiple TRPs, HARQ codebook feedback for multiple TRPs was also supported. In Rel-17, HARQ codebook enhancements were also under discussion in a number of work items.

Figure 3:
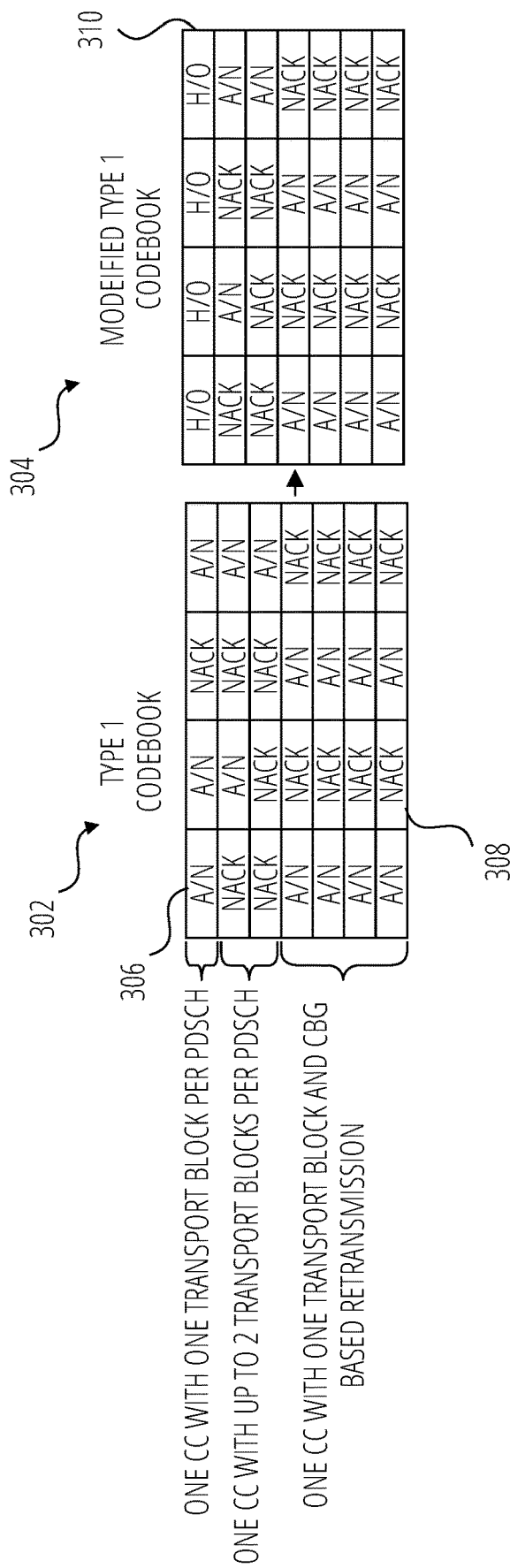
FIG. 3 illustrates a conversion of a Type 1 HARQ codebook to support enhanced feedback in accordance with one embodiment.
Figure 4:
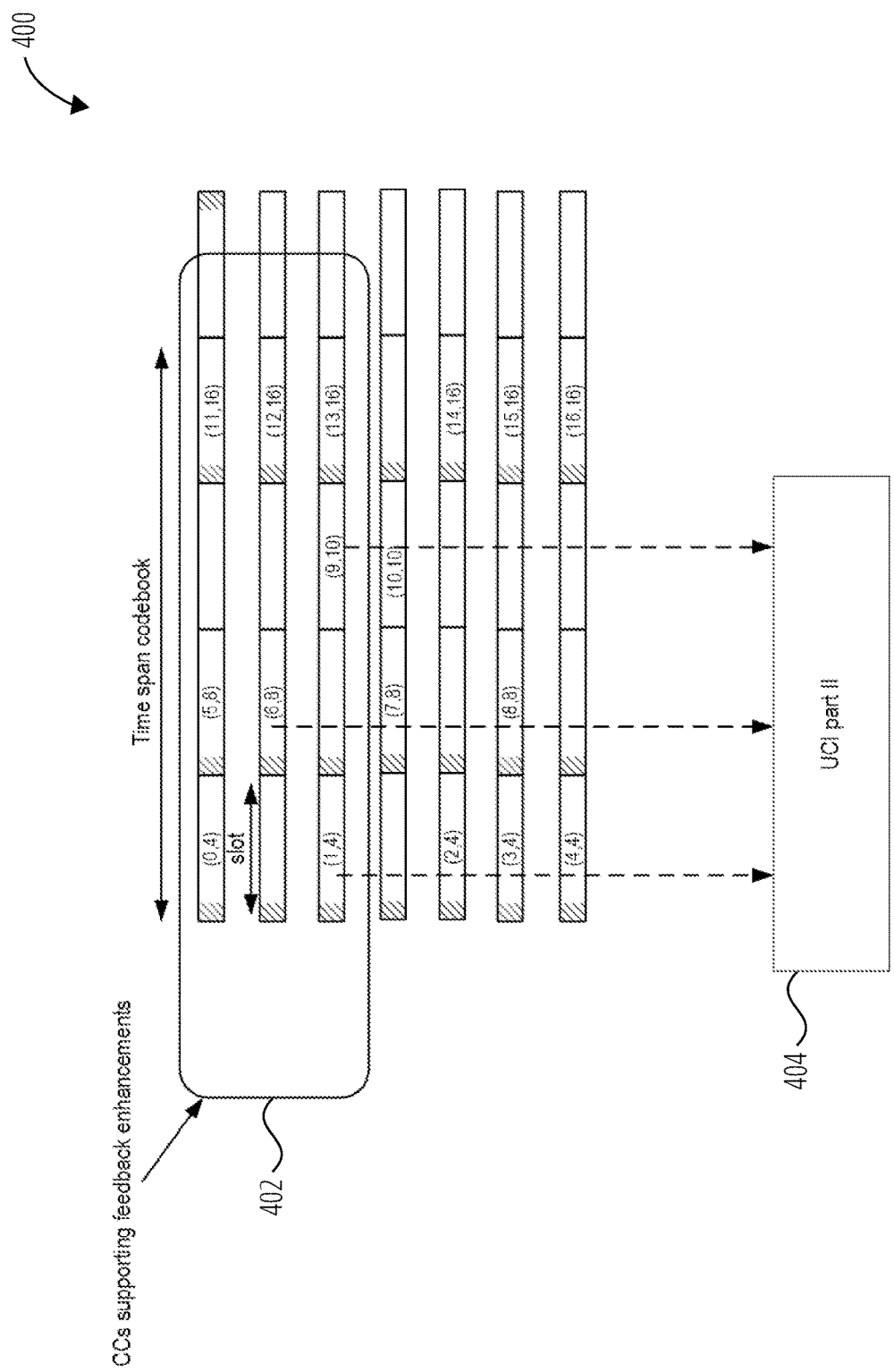
FIG. 4 illustrates a modified Type 2 HARQ codebook for use with enhanced feedback in accordance with one embodiment.
Figure 5:
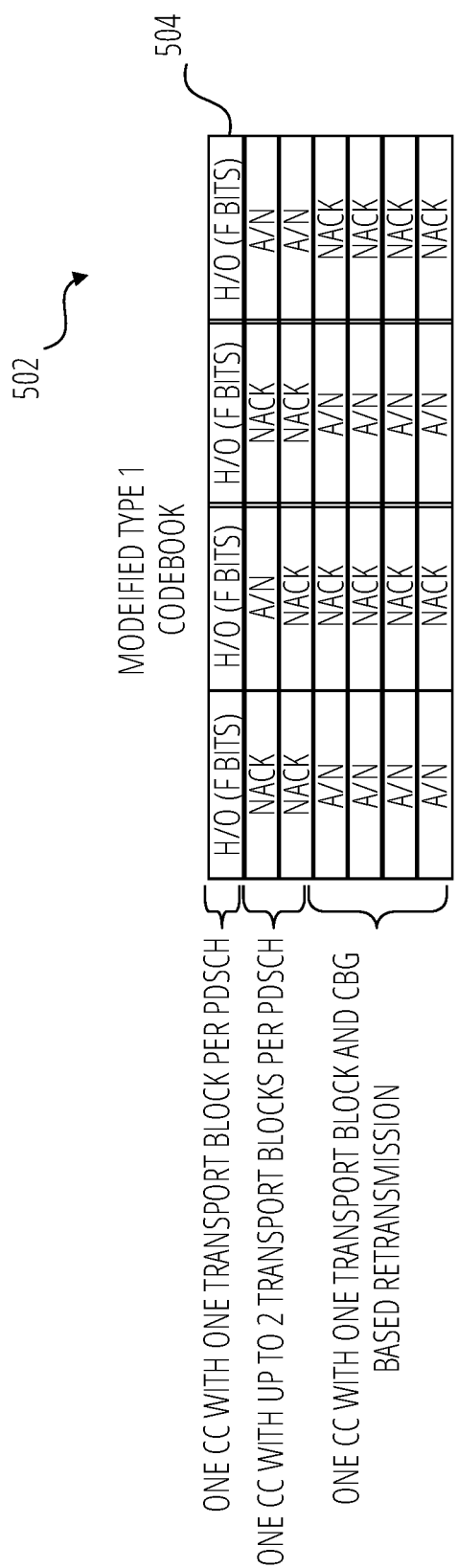
FIG. 5 illustrates a modified Type 1 HARQ codebook for multiple feedback bits in accordance with one embodiment.

For each HARQ codebook, use cases can be identified to justify its use for URLLC, industrial internet of things (IIoT), and XR applications. FIGS. 3-5 illustrate ways to introduce the enhanced feedback as an add-on to existing HARQ codebooks.

FIG. 3 illustrates a conversion of a Type 1 HARQ codebook 302 to support enhanced feedback. More specifically, modified Type 1 HARQ codebook 304 may support the embodiments described with reference to FIG. 2.

In Type 1 HARQ codebook 302 two code states may be indicated by a single bit: one for ACK, another for NACK/DTX. As shown, a first row of the Type 1 HARQ codebook 302 may correspond with one component carrier (CC) with one transport block per PDSCH. Rows two and three of the Type 1 HARQ codebook 302 may correspond with one CC with up to two transport blocks per PDSCH. Rows four through seven may correspond with one CC with one transport block and code block group (CBG) based retransmission. The Type 1 HARQ codebook 302 may be used to report HARQ feedback. For example, a bit 306 can be set to either ACK or NACK/DTX depending on PDSCH encoding outcome. Additionally, some bits, such as the bit 308, may be non-scheduled transmission and therefore set to NACK.

The modified Type 1 HARQ codebook 304 may use the first row 310 to represent modified HARQ-ACK bits rather than the original HARQ-ACK bit. In other words, instead of representing either ACK or NACK/DTX, the bits in the first row 310 may be used as a modified HARQ-ACK bit to signify two code states. For example, the modified HARQ-ACK bits of the first row 310 may be set to one for high ACK or ACK without further feedback information. The modified HARQ-ACK bits may be set to zero for the rest of the cases (e.g., low ACK, low NACK, high NACK) or a zero value bit may be used as feedback with further information indicated by the UE.

The enhanced feedback may come with signaling overhead. Hence it can be considered the enhanced feedback is supported for a CC supporting a single transport block with TB based HARQ feedback (transport block-based feedback). In another word, the conversion or modification of a HARQ codebook may be applied to PDSCHs on CCs configured a single transport block and TB based feedback for Type 1 HARQ codebook. In the modified Type 1 HARQ codebook 304, depending on where a HARQ feedback bit is located, it may carry different meaning. For example, the bits in the first row 310 the HARQ feedback bit may carry the modified meaning (e.g., high ARK or the other cases) and the bits in the other rows may carry the original two code state meaning (i.e., ACK or NACK/DTX). Thus, the feedback enhancement can be configured on per CC basis. Similar modification or conversion can be applied to Type 3 HARQ codebook and/or SPS HARQ only codebook: the conversion or modification can be limited to feedback occasions on a CC, on a subset of HARQ processes on a CC, on selected SPS configurations, or a combination thereof.

For example, the enhanced feedback may be configured on a per HARQ process number basis or on a per SPS configuration basis.

FIG. 4 illustrates a modified Type 2 HARQ codebook 400 for use with enhanced feedback. With a typical Type 2 HARQ codebook, if both TB based and CBG based feedback are present, the Type 2 HARQ codebook consists of two sub-codebooks: one for TB based HARQ feedback, and another for CBG based HARQ feedback. In some embodiments, the enhanced feedback may be supported for the TB based HARQ sub-codebook only. The feedback enhancements can be configured on a per CC basis. Similar to the discussion for Type 1 HARQ codebook from FIG. 3, modification or conversion for feedback in the modified Type 2 HARQ codebook 400 may be applied on eligible PDSCHs.

In the illustrated embodiment CCs 402 supporting feedback enhancements includes CC 0, CC 1, and CC 2. These CCs 402 are configured for enhanced feedback. That is, the CCs 402 may be used by the UE to transmit the feedback payloads described with reference to FIG. 2.

The modified Type 2 HARQ codebook 400 may comprise modified bits and unmodified bits. The modified bits may represent enhanced feedback and the unmodified bits may represent a standard ACK or NACK/DTX. For example, unmodified bits may represent ACK with a one and a NACK/DTX with a zero. Modified bits may represent a high ACK or ACK without further feedback information with a one and the modified bits may be set to zero for the rest of the cases (e.g., low ACK, low NACK, high NACK).

An example of feedback bits for the three CCs 402 supporting feedback enhancements may be [XXYYY XXYY XY XXXYYY]. The X bits may represent the unmodified bits and the Y bits may represent the modified bits. Using this configuration the UE and network node would have a systematic way to convert an existing HARQ codebook into a modified Type 2 HARQ codebook 400. In this example, the bits may be ordered such as $[X_1X_2YYY\ X_3X_4YY\ X_5Y\ X_6X_7X_8YYY]$. With the unmodified bits removed, the modified bits may be reported in an example as $[X_1X_2\ X_3X_4X_5\ X_6X_7X_8]=[101\ 00\ 111]$. In this example, at locations $X_1, X_3, X_6, X_7, X_8$ high ACKs are reported. At other positions (e.g., $X_2, X_4, X_5$) a high ACK is not reported and further feedback information may be provided in UCI Part II. In this example, in UCI part II, $\lceil \log_2(n_1+n_2+n_3+n_4)\rceil$ bits or $\lceil \log_2(n_1+n_2+n_3)\rceil$ bits may be used for each of $X_2, X_4, X_5$ respectively. Similar modification or conversion can be applied to enhanced Type 2 HARQ codebook.

For the feedback in UCI part II, omission rules can be also developed. For example, if the payload is not large enough to carry all of the feedback bits, then feedback for earlier occasions may be discarded first. Further, a second criterion for determining what feedback to omit can be based on the CC index.

FIG. 5 illustrates a modified Type 1 HARQ codebook 502 for multiple feedback bits provided in the feedback where the number of feedback bits is static irrespective of the PDSCH decoding status (e.g., the third embodiment discussed with reference to FIG. 2).

In the illustrated embodiments F bits are used for enhanced feedback for a single PDSCH transport block. As shown, the modified bits are included in the first row 504 of the modified Type 1 HARQ codebook 502 where there is one CC with one transport block per PDSCH. As shown, for each occasion eligible for enhanced feedback, F bits are included instead of 1 bit. The F bits may be encoded with a state of the PDSCH decoding outcome (e.g., high ACK, low ACK, low NACK, or high NACK. And additional information related to the decoding margin (e.g., delta MCS/CQI). The network node may deduce HARQ status ({ACK or NACK/DTX} or {ACK or NACK or DTX}) and PDSCH decoding margin from those F bits. In this embodiment, the number of bits (i.e., F) does not have any dependence on the decoding status. Similar modification or conversion can be made on Type 3 HARQ codebook, or SPS HARQ codebook, the replacement of the conventional HARQ-ACI bit(s) with fixed bits (F bits) can be according to component carrier, HARQ process ID, SPS configuration index, and combination thereof.

FIG. 6 is a flowchart of a method 600 for a UE to report enhanced feedback over PUSCH. The enhanced feedback may indicate both HARQ status (e.g., ACK, NACK, high ACK, low ACK, high NACK, low NACK) as well as feedback information such as delta MCS/CQI. The method 600 considers the case where enhanced feedback is carried over PUSCH.

A UE implementing the method 600 may receive 602 a PDSCH from a network node. The UE may attempt to decode 604, the PDSCH. The UE may successfully decode the PDSCH or fail to decode the PDSCH. The enhanced feedback may allow the UE to report the decoding outcome and additional information to the network node such as decoding margin.

The UE may encode 606 the enhanced feedback to indicate a PDSCH decoding outcome. The UE may include the enhanced feedback in a UCI. In some embodiments, the UE may split the enhanced feedback into multiple payloads in multiple sections of a UCI.

In some embodiments the enhanced feedback may be divided into a first payload (i.e., payload I) and a second payload (i.e., payload II). The first payload and the second payload may provide information regarding a state of PDSCH decoding (i.e., HARQ feedback) such as whether the state is one of a high ACK, low ACK, low Negative NACK, high NACK or a count of the number of PDSCHs corresponding to high ACKs. The second pay-load may provide additional information such as delta MCS/CQI.

The first payload may be a fixed payload carried irrespective of PDSCH decoding outcome. The second payload may include additional feedback information according to the payload content in some embodiments the first payload is a fixed number of bits irrespective of the PDSCH decoding outcome, and the second payload varies in size based on the PDSCH decoding outcome. In other embodiments, both the first payload and the second payload may be fixed.

In some embodiments, the first payload may be a bitmap representing high ACK status, and the second payload may include a list of delta/MCS. Such embodiments correspond to the description given with reference to the first embodiment of FIG. 2. For example, if the PDSCH decoding is a high ACK, the first payload may be set to "1", and the second payload may be empty. Further, a low ACK may be indicated by setting the first payload to "0", and setting the second payload to a delta MCS/CQI value in range 1. In some embodiments low ACK may be indicated by setting the first payload to "0" and setting the second payload to a code state for low ACK and delta MCS/CQI. A low NACK may be indicated by setting the first payload to "0", and setting the second payload to a delta MCS/CQI value in range 2. In some embodiments low NACK may be indicated by setting the first payload to "0" and setting the second payload to a code state for low NACK and delta MCS/CQI. A high NACK may be indicated by setting the first payload I to "0", and setting the second payload to a delta MCS/CQI value in range 3. In some embodiments high NACK may be indicated by setting the first payload to "0" and setting the second payload to a code state for high NACK and delta MCS/CQI.

In some embodiments, the first payload may be a counter of high ACKs, and the second payload may be a bitmap to represent high ACK status and a list of delta/MCS. Such embodiments correspond to the description given with reference to the second embodiment of FIG. 2. For instance a number of high ACKs may be indicated in the first payload, and the second payload may include a list of delta MCS/CQI for multiple PDSCHs and a bitmap for high ACKs. In some embodiments the list of delta MCS/CQI and the bitmap for high ACKs may be concatenated. For example, the bitmap may come first in the second payload followed by the list of the delta MCS/CQI. In the list of delta MCS/CQI, if the PDSCH decoding is a high ACK, then the delta MCS/CQI may be omitted.

In some embodiments, the second payload in lieu of a single HARQ feedback bit multiple feedback bits may be provided in the feedback, and the number of feedback bits does not change with the PDSCH decoding status. Such embodiments correspond to the description given with reference to the third embodiment of FIG. 2

The two payloads may be encoded in different parts of a UCI. The UCI may be divided up into a UCI part 0, a UCI Part II, and a UCI part III. The mapping rules for HARQ-ACK, CSI Part I and CSI part II over PUSCH may be based on the following. Denote the coded bits for UL-SCH as $g_0^{UL-SCH}, g_1^{UL-SCH}, g_2^{UL-SCH}, \ldots, g_{G^{UL-SCH}-1}^{UL-SCH}$. Denote the coded bits for HARQ-ACK or jointly coded bits for HARQ-ACK and CG-UCI when the high layer parameter cg-UCI-Multiplexing is configured, if any, as $g_0^{ACK}, g_1^{ACK}, g_2^{ACK}, g_3^{ACK}, \ldots, g_{G^{ACK}-1}^{ACK}$. Denote the coded bits for CSI part 1, if any, $g_0^{CSI-part1}, g_1^{CSI-part1}, g_2^{CSI-part1}, g_3^{CSI-part1}, \ldots, g_{G^{CSI-part1}-1}^{CSI-part1}$. Denote the coded bits for CSI part 2, if any, as $g_0^{CSI-part2}, g_1^{CSI-part2}, g_2^{CSI-part2}, g_3^{CSI-part2}, \ldots, g_{G^{CSI-part2}-1}^{CSI-part2}$. Denote the coded bits for CG-UCI without HARQ-ACK, if any, as $g_0^{CG-UCI}, g_1^{CG-UCI}, g_2^{CG-UCI}, g_3^{CG-UCI}, \ldots, g_{G^{CG-UCI}-1}^{CG-UCI}$. Denote the multiplexed data and control coded bit sequence as $g_0, g_1, g_2, g_3, \ldots, g_{G-1}$. Further denote the resources taken by HARQ-ACK and/or CG-UCI ($g_0^{ACK}, g_1^{ACK}, g_2^{ACK}, g_3^{ACK}, \ldots, g_{G^{ACK}-1}^{ACK}$ or $g_0^{ACK}, g_1^{ACK}, g_2^{ACK}, g_3^{ACK}, \ldots, g_{G^{ACK}-1}^{ACK}$), CSI Part I ($g_0^{CSI-part1}, g_1^{CSI-part1}, g_2^{CSI-part1}, g_3^{CSI-part1}, \ldots, g_{G^{CSI-part1}-1}^{CSI-part1}$) and CSI part II ($g_0^{CSI-part2}, g_1^{CSI-part2}, g_2^{CSI-part2}, g_3^{CSI-part2}, \ldots, g_{G^{CSI-part2}-1}^{CSI-part2}$) as UCI Part 0, UCI Part I and UCI part II respectively.

There may be a variety of ways for a UE to provide the enhanced feedback using PUSCH. For transmission over PUSCH, if HARQ feedback with enhancement is carried over a high priority (HP) PUSCH and is for HP PDSCHs, payload I may be carried over UCI part 0, and payload II may be carried over UCI part I or II. Payload II is not carried over UCI part 0 to avoid network node blind detection. Further, if HARQ feedback with enhancement is carried over a low priority (LP) PUSCH and is for LP PDSCHs, payload I may be carried over UCI part 0, and payload II may be carried over UCI part I or II. Additionally, if HARQ feedback with enhancement is carried over a HP PUSCH is for LP PDSCHs, payload I may be carried over UCI part 1 or UCI part 0 as an alternative solution, and payload II may be carried over UCI part I or II. Finally, if HARQ feedback with enhancement is carried over a LP PUSCH and is for HP PDSCHs, payload I may be carried over UCI part 0, and payload II may be carried over UCI part I. A UE may transmit 608 the enhanced feedback to the network node using PDSCH.

Embodiments contemplated herein include an apparatus comprising means to perform one or more elements of the method 600 and the method 200. This apparatus may be, for example, an apparatus of a UE (such as a wireless device 902 that is a UE, as described herein).

Embodiments contemplated herein include one or more non-transitory computer-readable media comprising instructions to cause an electronic device, upon execution of the instructions by one or more processors of the electronic device, to perform one or more elements of the method 600 and the method 200. This non-transitory computer-readable media may be, for example, a memory of a UE (such as a memory 906 of a wireless device 902 that is a UE, as described herein).

Embodiments contemplated herein include an apparatus comprising logic, modules, or circuitry to perform one or more elements of the method 600 and the method 200. This apparatus may be, for example, an apparatus of a UE (such as a wireless device 902 that is a UE, as described herein).

Embodiments contemplated herein include an apparatus comprising: one or more processors and one or more computer-readable media comprising instructions that, when executed by the one or more processors, cause the one or more processors to perform one or more elements of the method 600 and the method 200. This apparatus may be, for example, an apparatus of a UE (such as a wireless device 902 that is a UE, as described herein).

Embodiments contemplated herein include a signal as described in or related to one or more elements of the method 600 and the method 200.

Embodiments contemplated herein include a computer program or computer program product comprising instructions, wherein execution of the program by a processor is to cause the processor to carry out one or more elements of the method 600 and the method 200. The processor may be a processor of a UE (such as a processor(s) 904 of a wireless device 902 that is a UE, as described herein). These instructions may be, for example, located in the processor and/or on a memory of the UE (such as a memory 906 of a wireless device 902 that is a UE, as described herein).

Figure 7:
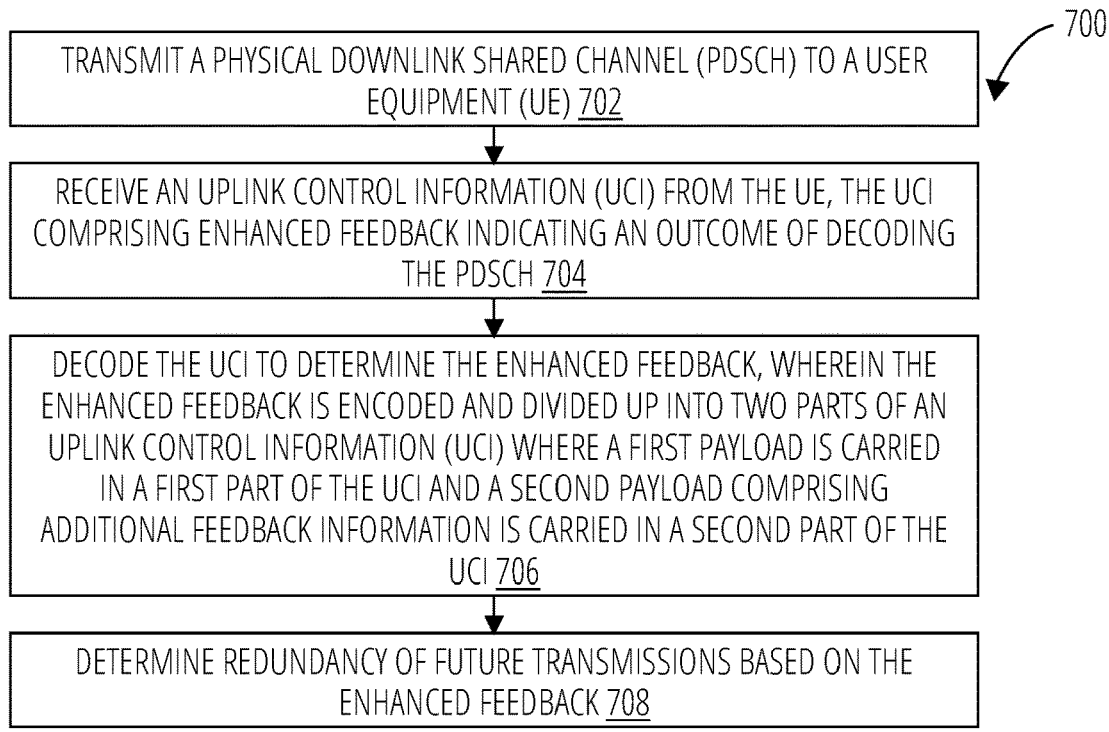
FIG. 7 is a flowchart of a method for a network node to receive enhanced feedback over PUCCH or PUSCH in accordance with one embodiment.

FIG. 7 is a flowchart of a method 700 for a network node to receive enhanced feedback over PUCCH or PUSCH. A network node implementing the method 700 may transmit 702 PDSCH to a UE. In network node may further receive 704 a UCI from the UE. The UCI may include enhanced feedback indicating an outcome of decoding the PDSCH and a decoding margin. The network node may further decode 706 the UCI to determine the enhanced feedback. The enhanced feedback may be encoded and divided up into two parts of the UCI where a first payload is carried in a first part of the UCI and a second payload comprising additional feedback information is carried in a second part of the UCI as described in the previous figures. The enhanced feedback may be used to determine 708 redundancy of future transmissions.

Embodiments contemplated herein include an apparatus comprising means to perform one or more elements of the method 700. This apparatus may be, for example, an apparatus of a base station (such as a network device 918 that is a base station, as described herein).

Embodiments contemplated herein include one or more non-transitory computer-readable media comprising instructions to cause an electronic device, upon execution of the instructions by one or more processors of the electronic device, to perform one or more elements of the method 700. This non-transitory computer-readable media may be, for example, a memory of a base station (such as a memory 922 of a network device 918 that is a base station, as described herein).

Embodiments contemplated herein include an apparatus comprising logic, modules, or circuitry to perform one or more elements of the method 700. This apparatus may be, for example, an apparatus of a base station (such as a network device 918 that is a base station, as described herein).

Embodiments contemplated herein include an apparatus comprising: one or more processors and one or more computer-readable media comprising instructions that, when executed by the one or more processors, cause the one or more processors to perform one or more elements of the method 700. This apparatus may be, for example, an apparatus of a base station (such as a network device 918 that is a base station, as described herein).

Embodiments contemplated herein include a signal as described in or related to one or more elements of the method 700.

Embodiments contemplated herein include a computer program or computer program product comprising instructions, wherein execution of the program by a processing element is to cause the processing element to carry out one or more elements of the method 700. The processor may be a processor of a base station (such as a processor(s) 920 of a network device 918 that is a base station, as described herein). These instructions may be, for example, located in the processor and/or on a memory of the base station (such as a memory 922 of a network device 918 that is a base station, as described herein).

Figure 8:
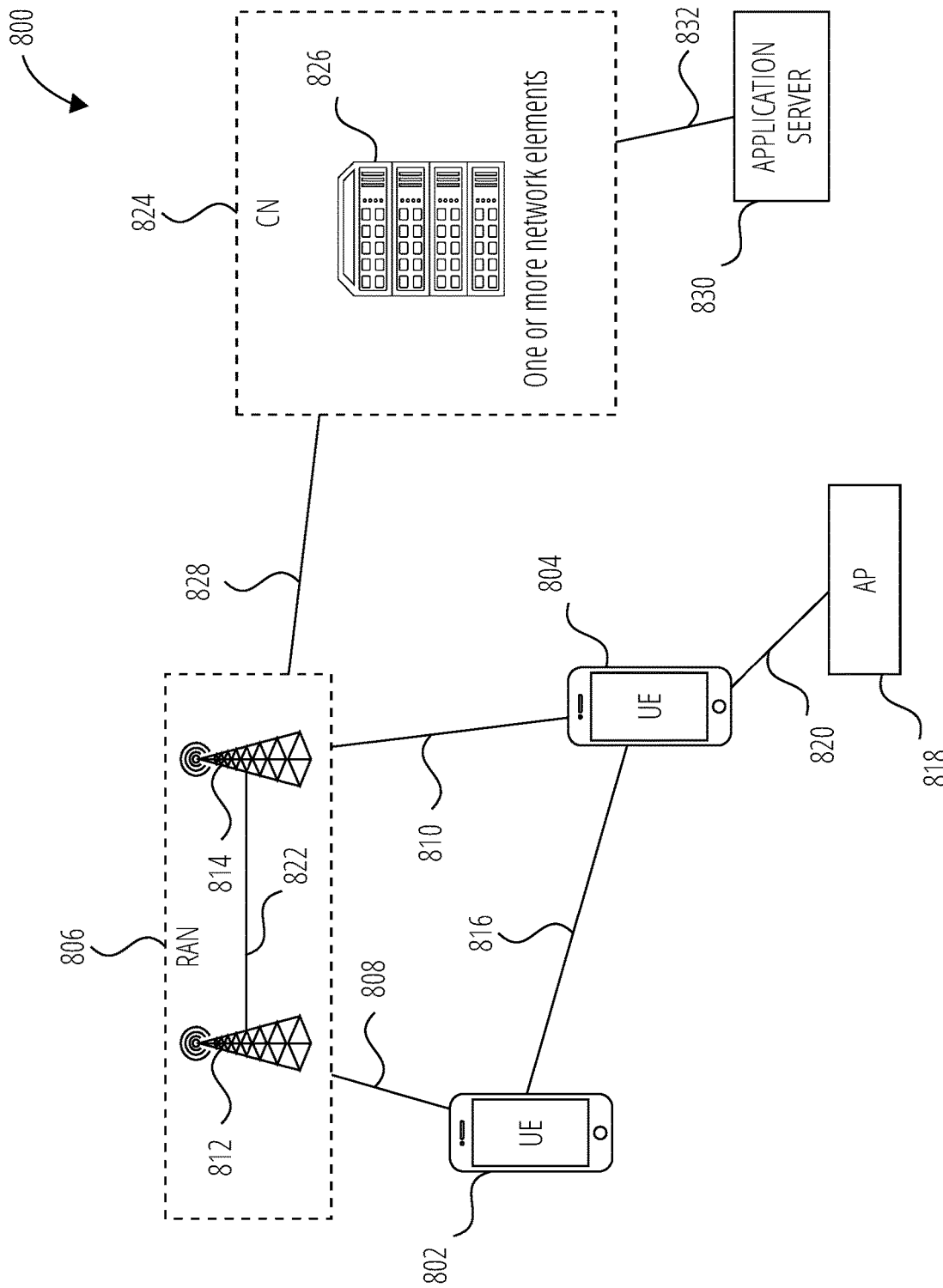
FIG. 8 illustrates an example architecture of a wireless communication system, according to embodiments disclosed herein.

FIG. 8 illustrates an example architecture of a wireless communication system 800, according to embodiments disclosed herein. The following description is provided for an example wireless communication system 800 that operates in conjunction with the LTE system standards and/or 5G or NR system standards as provided by 3GPP technical specifications.

As shown by FIG. 8, the wireless communication system 800 includes UE 802 and UE 804 (although any number of UEs may be used). In this example, the UE 802 and the UE 804 are illustrated as smartphones (e.g., handheld touchscreen mobile computing devices connectable to one or more cellular networks), but may also comprise any mobile or non-mobile computing device configured for wireless communication.

The UE 802 and UE 804 may be configured to communicatively couple with a RAN 806. In embodiments, the RAN 806 may be NG-RAN, E-UTRAN, etc. The UE 802 and UE 804 utilize connections (or channels) (shown as connection 808 and connection 810, respectively) with the RAN 806, each of which comprises a physical communications interface. The RAN 806 can include one or more base stations, such as base station 812 and base station 814, that enable the connection 808 and connection 810.

In this example, the connection 808 and connection 810 are air interfaces to enable such communicative coupling, and may be consistent with RAT(s) used by the RAN 806, such as, for example, an LTE and/or NR.

In some embodiments, the UE 802 and UE 804 may also directly exchange communication data via a sidelink interface 816. The UE 804 is shown to be configured to access an access point (shown as AP 818) via connection 820. By way of example, the connection 820 can comprise a local wireless connection, such as a connection consistent with any IEEE 802.11 protocol, wherein the AP 818 may comprise a Wi-Fix router. In this example, the AP 818 may be connected to another network (for example, the Internet) without going through a CN 824.

In embodiments, the UE 802 and UE 804 can be configured to communicate using orthogonal frequency division multiplexing (OFDM) communication signals with each other or with the base station 812 and/or the base station 814 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 812 or base station 814 may be implemented as one or more software entities running on server computers as part of a virtual network. In addition, or in other embodiments, the base station 812 or base station 814 may be configured to communicate with one another via interface 822. In embodiments where the wireless communication system 800 is an LTE system (e.g., when the CN 824 is an EPC), the interface 822 may be an X2 interface. The X2 interface may be defined between two or more base stations (e.g., two or more eNBs and the like) that connect to an EPC, and/or between two eNBs connecting to the EPC. In embodiments where the wireless communication system 800 is an NR system (e.g., when CN 824 is a 5GC), the interface 822 may be an Xn interface. The Xn interface is defined between two or more base stations (e.g., two or more gNBs and the like) that connect to 5GC, between a base station 812 (e.g., a gNB) connecting to 5GC and an eNB, and/or between two eNBs connecting to 5GC (e.g., CN 824).

The RAN 806 is shown to be communicatively coupled to the CN 824. The CN 824 may comprise one or more network elements 826, which are configured to offer various data and telecommunications services to customers/subscribers (e.g., users of UE 802 and UE 804) who are connected to the CN 824 via the RAN 806. The components of the CN 824 may be implemented in one physical device or separate physical devices including components to read and execute instructions from a machine-readable or computer-readable medium (e.g., a non-transitory machine-readable storage medium).

In embodiments, the CN 824 may be an EPC, and the RAN 806 may be connected with the CN 824 via an S1 interface 828. In embodiments, the S1 interface 828 may be split into two parts, an S1 user plane (S1-U) interface, which carries traffic data between the base station 812 or base station 814 and a serving gateway (S-GW), and the S1-MME interface, which is a signaling interface between the base station 812 or base station 814 and mobility management entities (MMEs).

In embodiments, the CN 824 may be a 5GC, and the RAN 806 may be connected with the CN 824 via an NG interface 828. In embodiments, the NG interface 828 may be split into two parts, an NG user plane (NG-U) interface, which carries traffic data between the base station 812 or base station 814 and a user plane function (UPF), and the S1 control plane (NG-C) interface, which is a signaling interface between the base station 812 or base station 814 and access and mobility management functions (AMFs).

Generally, an application server 830 may be an element offering applications that use internet protocol (IP) bearer resources with the CN 824 (e.g., packet switched data services). The application server 830 can also be configured to support one or more communication services (e.g., VoIP sessions, group communication sessions, etc.) for the UE 802 and UE 804 via the CN 824. The application server 830 may communicate with the CN 824 through an IP communications interface 832.

Figure 9:
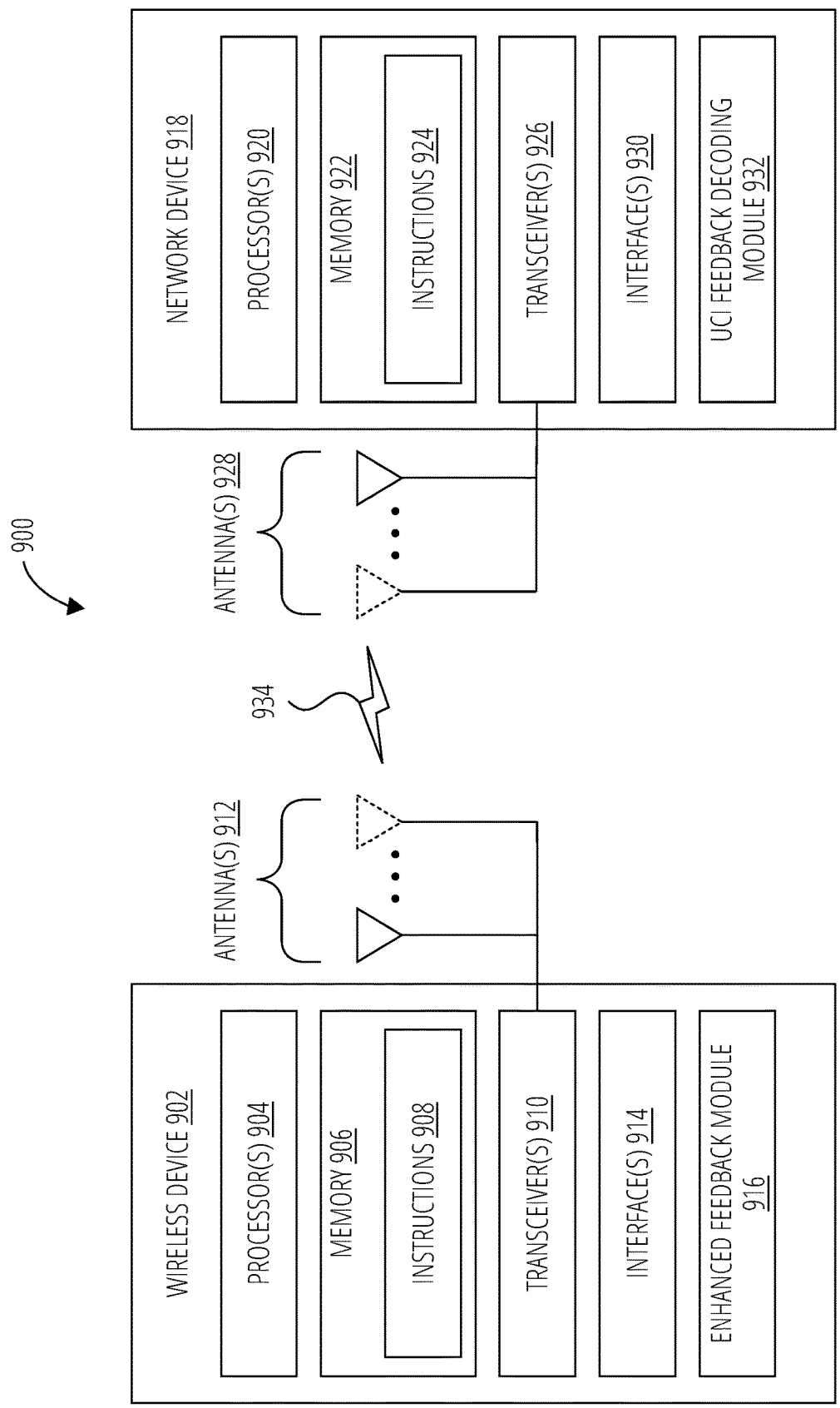
FIG. 9 illustrates a system for performing signaling between a wireless device and a network device, according to embodiments disclosed herein.

FIG. 9 illustrates a system 900 for performing signaling 934 between a wireless device 902 and a network device 918, according to embodiments disclosed herein. The system 900 may be a portion of a wireless communications system as herein described. The wireless device 902 may be, for example, a UE of a wireless communication system. The network device 918 may be, for example, a base station (e.g., an eNB or a gNB) of a wireless communication system.

The wireless device 902 may include one or more processor(s) 904. The processor(s) 904 may execute instructions such that various operations of the wireless device 902 are performed, as described herein. The processor(s) 904 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 902 may include a memory 906. The memory 906 may be a non-transitory computer-readable storage medium that stores instructions 908 (which may include, for example, the instructions being executed by the processor(s) 904). The instructions 908 may also be referred to as program code or a computer program. The memory 906 may also store data used by, and results computed by, the processor(s) 904.

The wireless device 902 may include one or more transceiver(s) 910 that may include radio frequency (RF) transmitter and/or receiver circuitry that use the antenna(s) 912 of the wireless device 902 to facilitate signaling (e.g., the signaling 934) to and/or from the wireless device 902 with other devices (e.g., the network device 918) according to corresponding RATs.

The wireless device 902 may include one or more antenna(s) 912 (e.g., one, two, four, or more). For embodiments with multiple antenna(s) 912, the wireless device 902 may leverage the spatial diversity of such multiple antenna(s) 912 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 902 may be accomplished according to precoding (or digital beamforming) that is applied at the wireless device 902 that multiplexes the data streams across the antenna(s) 912 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 902 may implement analog beamforming techniques, whereby phases of the signals sent by the antenna(s) 912 are relatively adjusted such that the (joint) transmission of the antenna(s) 912 can be directed (this is sometimes referred to as beam steering).

The wireless device 902 may include one or more interface(s) 914. The interface(s) 914 may be used to pro-vide input to or output from the wireless device 902. For example, a wireless device 902 that is a UE may include interface(s) 914 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver (s) 910/antenna(s) 912 already described) that allow for communication between the UE and other devices and may operate according to known protocols (e.g., Wi-Fi®, Blu-etooth®, and the like).

The wireless device 902 may include an enhanced feedback module 916. The enhanced feedback module 916 may be implemented via hardware, software, or combinations thereof. For example, the enhanced feedback module 916 may be implemented as a processor, circuit, and/or instructions 908 stored in the memory 906 and executed by the processor(s) 904. In some examples, the enhanced feedback module 916 may be integrated within the processor(s) 904 and/or the transceiver(s) 910. For example, the enhanced feedback module 916 may be implemented by a combination of software components (e.g., executed by a DSP or a general processor) and hardware components (e.g., logic gates and circuitry) within the processor(s) 904 or the transceiver(s) 910.

The enhanced feedback module 916 may be used for various aspects of the present disclosure, for example, aspects of FIGS. 2-6. The enhanced feedback module 916 is configured to perform method 200 or method 600.

The network device 918 may include one or more processor(s) 920. The processor(s) 920 may execute instructions such that various operations of the network device 918 are performed, as described herein. The processor(s) 904 may include one or more baseband processors implemented using, for example, a CPU, a DSP, an ASIC, a controller, an FPGA device, another hardware device, a firmware device, or any combination thereof configured to perform the operations described herein.

The network device 918 may include a memory 922. The memory 922 may be a non-transitory computer-readable storage medium that stores instructions 924 (which may include, for example, the instructions being executed by the processor(s) 920). The instructions 924 may also be referred to as program code or a computer program. The memory 922 may also store data used by, and results computed by, the processor(s) 920.

The network device 918 may include one or more transceiver(s) 926 that may include RF transmitter and/or receiver circuitry that use the antenna(s) 928 of the network device 918 to facilitate signaling (e.g., the signaling 934) to and/or from the network device 918 with other devices (e.g., the wireless device 902) according to corresponding RATs.

The network device 918 may include one or more antenna(s) 928 (e.g., one, two, four, or more). In embodiments having multiple antenna(s) 928, the network device 918 may perform MIMO, digital beamforming, analog beamforming, beam steering, etc., as has been described.

The network device 918 may include one or more interface(s) 930. The interface(s) 930 may be used to provide input to or output from the network device 918. For example, a network device 918 that is a base station may include interface(s) 930 made up of transmitters, receivers, and other circuitry (e.g., other than the transceiver(s) 926/antenna(s) 928 already described) that enables the base station to communicate with other equipment in a core network, and/or that enables the base station to communicate with external networks, computers, databases, and the like for purposes of operations, administration, and maintenance of the base station or other equipment operably connected thereto.

The network device 918 may include a UCI feedback decoding module 932. The UCI feedback decoding module 932 may be implemented via hardware, software, or combinations thereof. For example, the UCI feedback decoding module 932 may be implemented as a processor, circuit, and/or instructions 924 stored in the memory 922 and executed by the processor(s) 920. In some examples, the UCI feedback decoding module 932 may be integrated within the processor(s) 920 and/or the transceiver(s) 926. For example, the UCI feedback decoding module 932 may be implemented by a combination of software components (e.g., executed by a DSP or a general processor) and hardware components (e.g., logic gates and circuitry) within the processor(s) 920 or the transceiver(s) 926.

The UCI feedback decoding module 932 may be used for various aspects of the present disclosure, for example, aspects of FIG. 7.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a User Equipment (UE), the method comprising:
    receiving a Physical Downlink Shared Channel (PDSCH) from a network node;
    attempting to decode the PDSCH;
    encoding enhanced feedback indicating a PDSCH decoding outcome in an uplink control information (UCI), wherein the enhanced feedback is encoded and divided up into two parts of the UCI, wherein a first payload is carried in a first part of the UCI and a second payload comprising additional feedback information is carried in a second part of the UCI, wherein when the UCI is carried over PUSCH, and wherein when HARQ feedback with the enhanced feedback is carried over a LP PUSCH and is for HP PDSCHs, the first payload is carried over a UCI part 0, and the second payload is carried over a UCI part I or a UCI part II, and
    transmitting the enhanced feedback to the network node.

2. The method of claim 1, wherein the first payload is a fixed number of bits irrespective of the PDSCH decoding outcome, and the second payload varies in size based on the PDSCH decoding outcome.

3. The method of claim 1, wherein the first payload and the second payload provide information regarding a state of PDSCH decoding, wherein the state may be one of a high Acknowledgement (ACK), low ACK, low Negative Acknowledgement (NACK), high NACK.

4. The method of claim 1, wherein the UCI is carried over Physical Uplink Control Channel (PUCCH), wherein the first payload comprises a bitmap to represent high ACK status and the first part of the UCI is a UCI part I, and wherein the second payload comprises a list of delta modulation coding scheme (MCS) or Channel Quality Indicator (CQI) and the second part of the UCI is a UCI part II.

5. The method of claim 1, wherein the UCI is carried over PUCCH, wherein the first payload comprises a counter of high ACKs and the first part of the UCI is a UCI part I, and wherein the second payload comprises a bitmap to represent high ACK status and a list of delta MCS or CQI and the second part of the UCI is a UCI part II.

6. The method of claim 1, wherein the UCI is carried over Physical Uplink Shared Channel (PUSCH), wherein when HARQ feedback with the enhanced feedback is carried over a HP PUSCH and is for HP PDSCHs, the first payload is carried over a UCI part 0, and the second payload is carried over a UCI part I or a UCI part II.

7. The method of claim 1, wherein the UCI is carried over PUSCH, wherein when HARQ feedback with the enhanced feedback is carried over a LP PUSCH and is for LP PDSCHs, the first payload is carried over a UCI part 0, and the second payload is carried over a UCI part I or a UCI part II.

8. The method of claim 1, wherein the UCI is carried over PUSCH, wherein when HARQ feedback with the enhanced feedback is carried over a HP PUSCH and is for LP PDSCHs, the first payload is carried over a UCI part 1 or a UCI part 0, and the second payload is carried over the UCI part I or a UCI part II.

9. The method of claim 1, wherein the enhanced feedback is configured on a per component carrier (CC) basis.

10. The method of claim 1, wherein the enhanced feedback is configured on a per HARQ process number basis.

11. The method of claim 1, wherein the enhanced feedback is configured on a per SPS configuration basis.

12. A method for a network node, the method comprising:
transmitting a Physical Downlink Shared Channel (PDSCH) to a user equipment (UE);
receiving an uplink control information (UCI) from the UE, the UCI comprising enhanced feedback indicating an outcome of decoding the PDSCH;
decoding the UCI to determine the enhanced feedback, wherein the enhanced feedback is encoded and divided up into two parts of the UCI where a first payload is carried in a first part of the UCI and a second payload comprising additional feedback information is carried in a second part of the UCI, wherein the first payload is a fixed number of bits irrespective of the outcome of decoding PDSCH, and the second payload varies in size based on the outcome of decoding PDSCH; and
determining redundancy of future transmissions based on the enhanced feedback.

13. The method of claim 12, wherein the first payload and the second payload provide information regarding a state of PDSCH decoding, wherein the state may be one of a high Acknowledgement (ACK), low ACK, low Negative Acknowledgement (NACK), high NACK.

14. The method of claim 12, wherein the UCI is carried over Physical Uplink Control Channel (PUCCH), wherein the first payload comprises a bitmap to represent high ACK status and the first part of the UCI is a UCI part I, and wherein the second payload comprises a list of delta modulation coding scheme (MCS) or Channel Quality Indicator (CQI) and the second part of the UCI is a UCI part II.

15. The method of claim 12, wherein the UCI is carried over PUCCH, wherein the first payload comprises a counter of high ACKs and the first part of the UCI is a UCI part I, and wherein the second payload comprises a bitmap to represent high ACK status and a list of delta MCS or CQI and the second part of the UCI is a UCI part II.

16. The method of claim 12, wherein the UCI is carried over Physical Uplink Shared Channel (PUSCH), wherein when HARQ feedback with the enhanced feedback is carried over a HP PUSCH and is for HP PDSCHs, the first payload is carried over a UCI part 0, and the second payload is carried over a UCI part I or a UCI part II.

17. The method of claim 12, wherein the UCI is carried over PUSCH, wherein when HARQ feedback with the enhanced feedback is carried over a LP PUSCH and is for LP PDSCHs, the first payload is carried over a UCI part 0, and the second payload is carried over a UCI part I or a UCI part II.

18. The method of claim 12, wherein the UCI is carried over PUSCH, wherein when HARQ feedback with the enhanced feedback is carried over a HP PUSCH and is for LP PDSCHs, the first payload is carried over a UCI part 1 or a UCI part 0, and the second payload is carried over the UCI part I or a UCI part II.

* * * * *